(No Model.)  6 Sheets—Sheet 1.
J. C. MARTIN.
STORE SERVICE APPARATUS.
No. 368,219.  Patented Aug. 16, 1887.
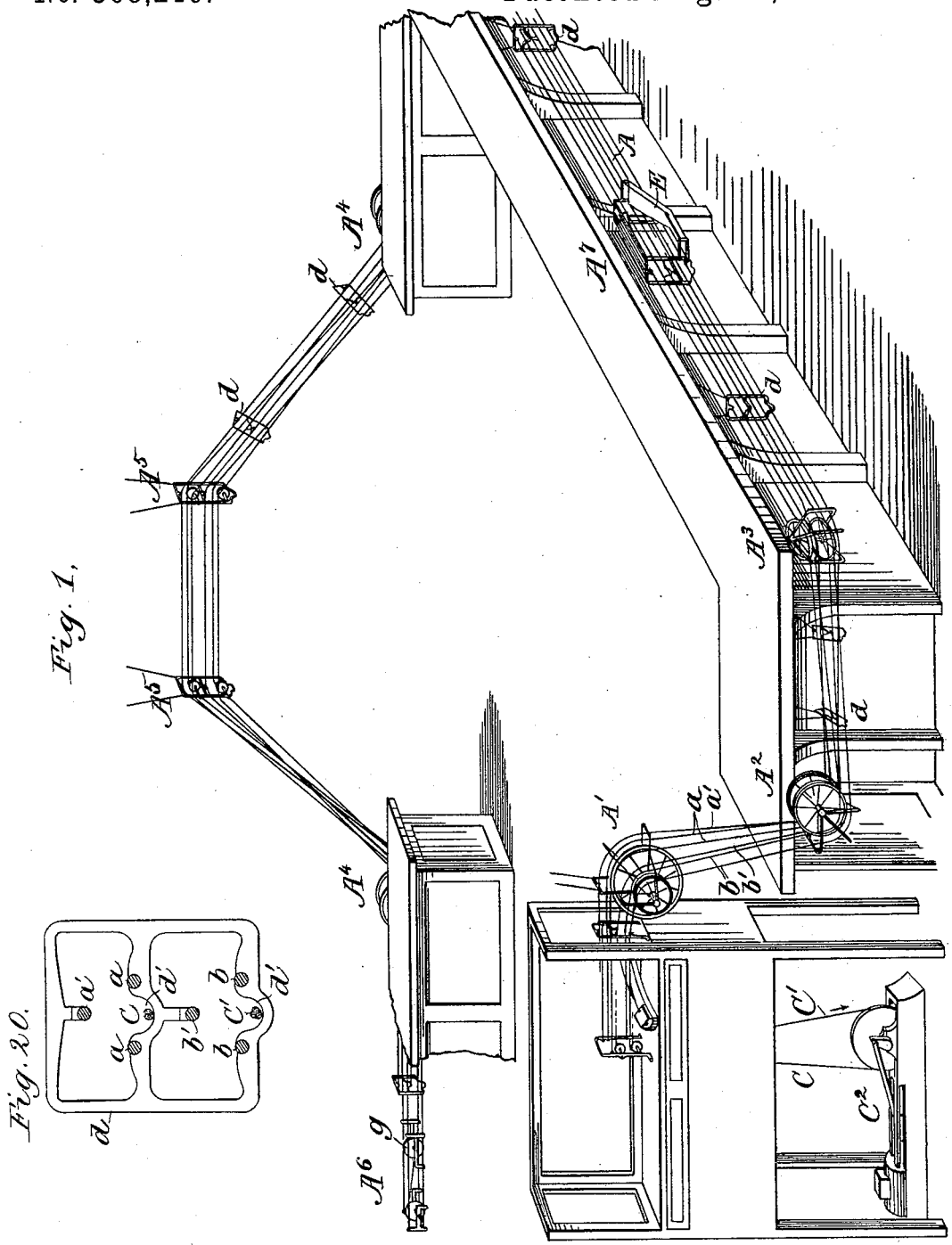
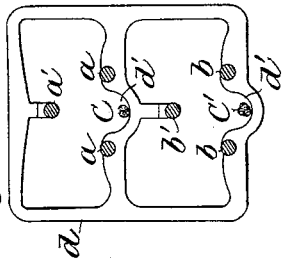
Witnesses,
Jas. J. Maloney
H. P. Bates
Inventor,
Joseph C. Martin,
by Jos. P. Livermore
Att'y.

(No Model.) 6 Sheets—Sheet 2.
J. C. MARTIN.
STORE SERVICE APPARATUS.
No. 368,219. Patented Aug. 16, 1887.
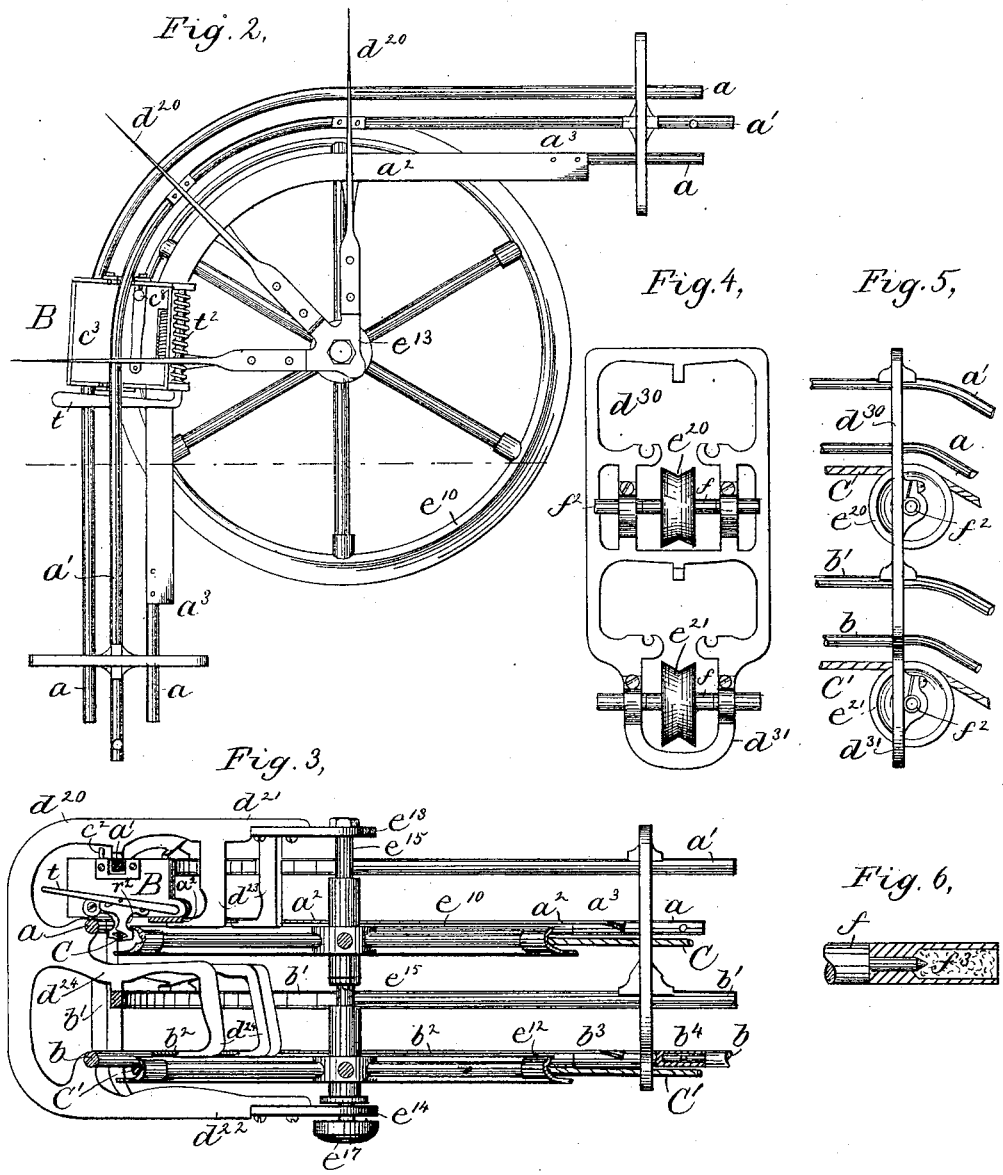
Witnesses.
Jas. J. Maloney
H. P. Bates
Inventor,
Joseph C. Martin
by Jos. P. Livermore
Att'y.

(No Model.)    6 Sheets—Sheet 3.
J. C. MARTIN.
STORE SERVICE APPARATUS.
No. 368,219.    Patented Aug. 16, 1887.
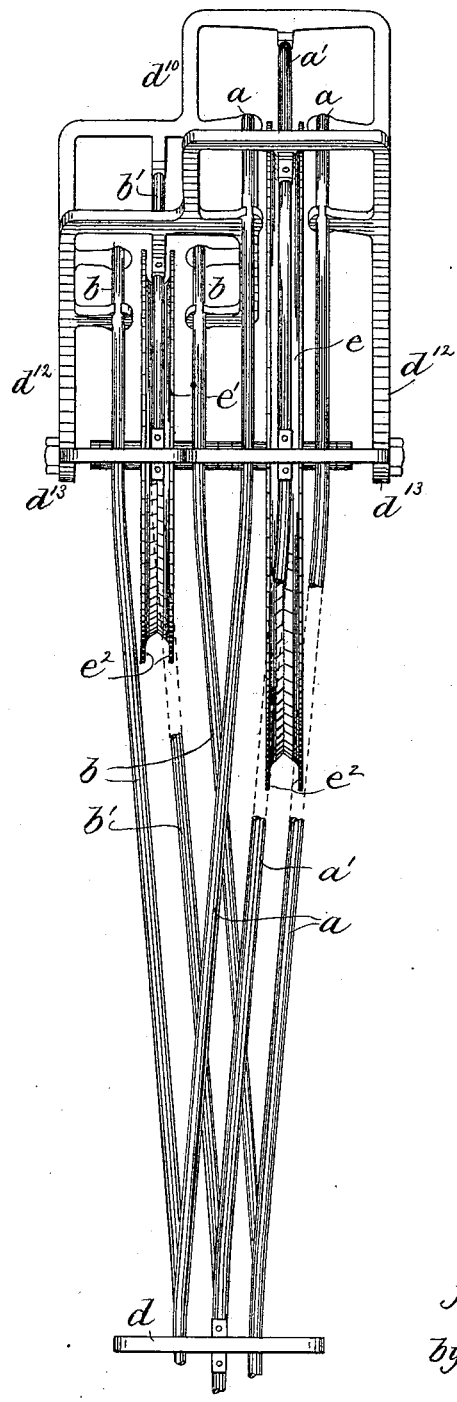
Witnesses,
Jas. J. Maloney
H. P. Bates
Inventor,
Joseph C. Martin
by Jos. P. Livermore
Att'y.

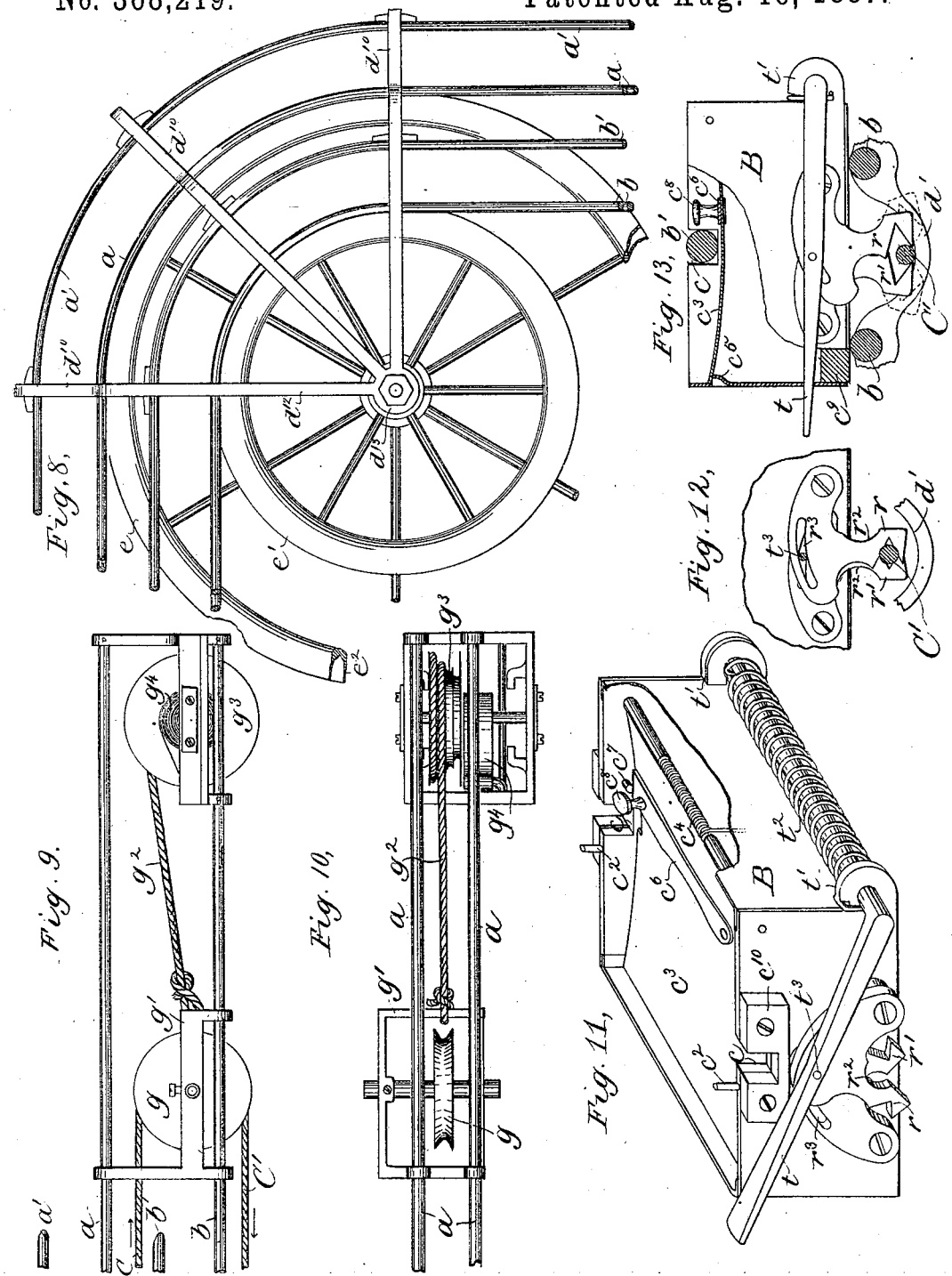

(No Model.) 6 Sheets—Sheet 5.
J. C. MARTIN.
STORE SERVICE APPARATUS.
No. 368,219. Patented Aug. 16, 1887.
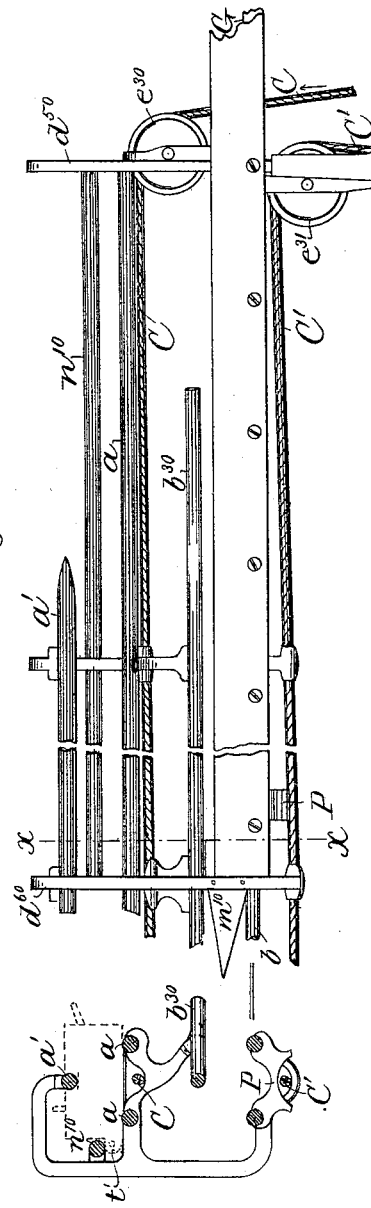
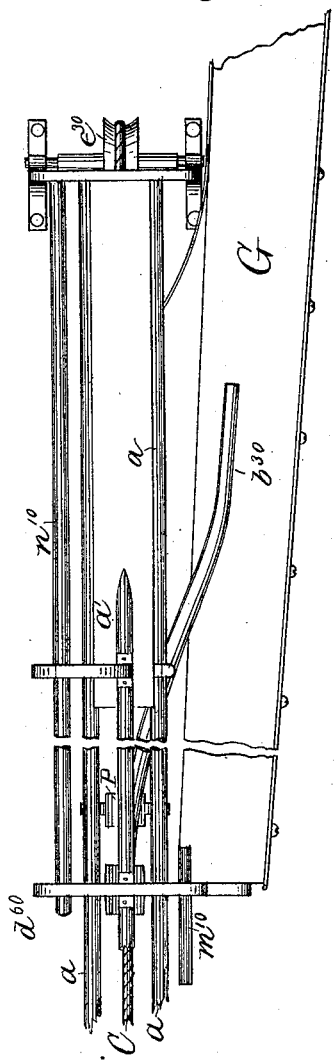
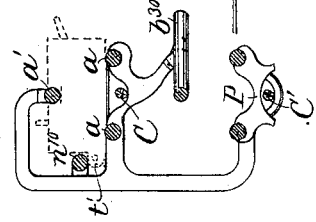
Witnesses,
Jas. J. Maloney.
H. P. Bates.
Inventor,
Joseph C. Martin
by Jos. P. Livermore
Atty.

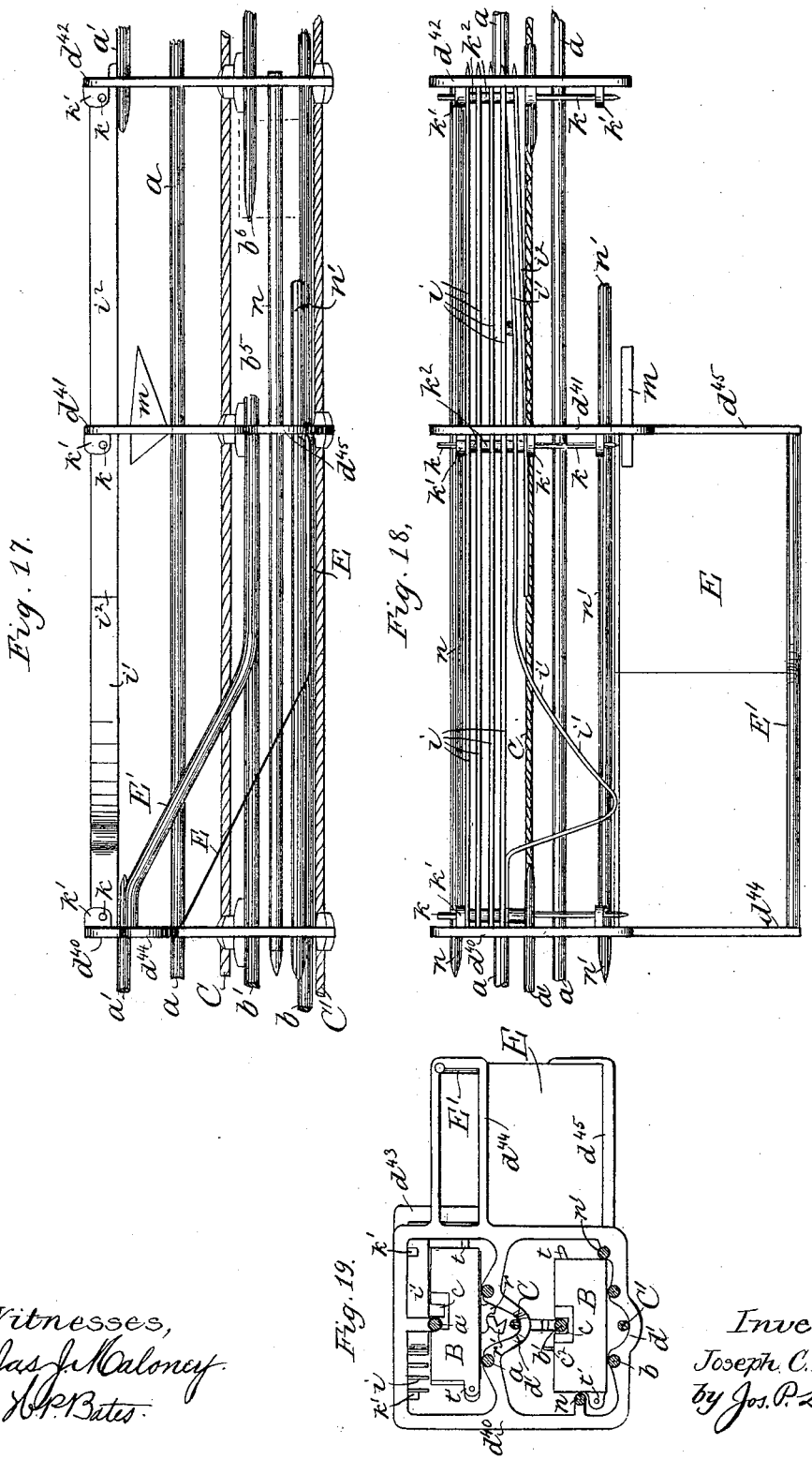

UNITED STATES PATENT OFFICE.

JOSEPH C. MARTIN, OF FLORENCE, MASSACHUSETTS.

STORE-SERVICE APPARATUS.

SPECIFICATION forming part of Letters Patent No. 368,219, dated August 16, 1887.

Application filed August 12, 1886. Serial No. 210,737. (No model.)

*To all whom it may concern:*

Be it known that I, JOSEPH C. MARTIN, of Florence, county of Hampshire, State of Massachusetts, have invented an Improvement in Conveying Apparatus for Store-Service, of which the following description, in connection with the accompanying drawings, is a specification, like letters on the drawings representing like parts.

My invention is embodied in a conveying apparatus for store-service having the same general construction and principle of operation as the apparatus shown in Letters Patent No. 284,456, dated September 4, 1883, and No. 314,339, dated March 24, 1885, to which reference may be had, the said apparatus consisting in general of a way or line of transportation comprising two tracks or guideways extending between the cashier's desk and stations along the counters of the store, and a propelling-cord by which carriers or boxes are propelled along the said tracks in opposite directions, and special guides at the different stations by which each box is guided off from the track and delivered at the station to which it belongs.

The present invention consists mainly in various details of construction of the several appliances by which the efficiency and convenience of operation of the apparatus are increased. A portion of the improvements relate especially to the construction of the tracks, and consists in appliances by which the propelling-cord and tracks or guideways may be turned at any desired angle, enabling the tracks to have any desired direction, so as to reach all the points that may be needed. The direction of the propelling-cord is changed by means of wheels or pulleys around which the said cord runs, the tracks and cord being substantially straight between the said pulleys, and various devices have to be employed to enable the boxes to be carried around the wheels or pulleys by means of the propelling-cord while themselves guided by the tracks without becoming disconnected from the propelling-cord or throwing the propelling-cord off from its support or guiding-pulleys.

The invention also consists in appliances for maintaining the proper tension in the propelling-cord, and also for automatically relieving the pressure of the cord on its actuating-pulley, so that it will stop running without breakage of any of the parts in case one of the carriers should be obstructed.

The invention also consists in details of construction of the appliances at the different stations, facilitating the operation of applying the carriers or boxes to the tracks and connecting them with the propelling-cord, and also in appliances for facilitating the detachment of the carriage from the propelling-cord at the cashier's desk or a terminal station to which all the carriers placed upon one of the tracks are sent.

Figure 1 is a perspective view illustrating the general construction and arrangement of the way or line of transportation; Fig. 2, a plan view, and Fig. 3 a vertical section representing the construction at an angle in the tracks such as used where the plane of the bottom of the box coincides with the plane in which the angle of the tracks lies; Figs. 4 and 5, front and side elevations of the devices employed at an angle in which the plane of the bottom of the box is at right angles to the plane in which the tracks lie; Fig. 6, a detail showing the construction of the bearing of the cord-guiding pulleys; Figs. 7 and 8, front and side elevations of other devices employed at an angle in which the plane of the bottom of the box is at right angles to that in which the tracks lie; Figs. 9 and 10, a side elevation and plan view of the devices employed at the end of the tracks remote from the cashier's desk; Fig. 11, a perspective view of one of the boxes in full size; Fig. 12, a detail of the cord-gripping clutch of the box in the position occupied when the cord is gripped by it; Fig. 13, a similar detail representing the clutch in the act of picking up the cord to grip the same; Figs. 14 and 15, a side elevation and plan view of the parts constituting the terminal station at the cashier's desk; Fig. 16, a transverse section on line *x x*, Fig. 14; Figs. 17 and 18, a side elevation and plan view of the parts constituting one of the stations along the return-track; Fig. 19, a transverse section of the tracks, showing in elevation the brackets used at stations; and Fig. 20, Sheet 1, a transverse section of the tracks, showing in elevation the brackets used between stations.

The line of transportation or way A, Fig. 1, consists of a series of parallel rods or wires arranged substantially as shown in Letters Patent No. 284,456, being intended to co-operate with cash-boxes B, (see Fig. 11,) having the general construction shown in Letters Patent No. 314,339. The way A comprises two separate tracks, on which the said cash-boxes B travel in opposite directions, and each track consists of three rods, two of which (marked $a$ on the return-track and $b$ on the forwarding-track) engage the under surface or bottom of the cash-boxes B when in its normal position, and may be called the "supporting" rails or rods, while the third wire, $a'$, of the return-track and $b'$ of the forwarding-track engage notches $c$ in the ends of the cash-boxes, and thus hold the said cash-boxes in engagement with the other two rods of the track and prevent lateral movement of the box with relation to the track. The three rods of each track practically embrace each box and restrain it from movement in any direction except lengthwise of the track. The guidance of the box is thus substantially the same as if it were inclosed in a tube, and gravity is not depended upon to keep the box on the track, and the box may run in any direction and may be in any position that the direction of the track may require. The boxes are propelled along these tracks by an endless cord or belt, C C', driven by a suitable motor, (indicated at $C^2$, Fig. 1,) the said cord running through guide-grooves $d'$ in the brackets $d$, (see Fig. 20, Sheet 1,) that support the rods forming the tracks wherever the tracks run in a straight line, and passing around guide pulleys or wheels at the various angles in the tracks.

The cash-boxes B are provided with clutches $r\ r'$, the construction and operation of which will be hereinafter more fully described, which seize the propelling-cord and cause the boxes to be carried along therewith. The jaws $r\ r'$ of the clutch, when engaged with the cord, are slightly above the cord-guides $d'$, which they pass over freely, as shown in Fig. 12. The greater portion of the tracks will usually be in a substantially horizontal direction, with the cash-boxes upright and resting on the wires $a\ a$ and $b\ b$ beneath them, and the one track vertically over the other. When, however, it is desired to turn the tracks from the horizontal direction downward at any considerable angle, as indicated at A', Fig. 1, the construction of the tracks and the guide for the cord may be as shown at A', Fig. 1, and as shown on a larger scale in Figs. 7 and 8. At these points one of the tracks is moved laterally with relation to the other, as shown in Fig. 7, and the brackets $d^{10}$, that support the wires or rods of the tracks and hold them in proper position with relation to one another, are provided with an extension, $d^{12}$, below the lower rods of both tracks, having bearings $d^{13}$ for guide-wheels $e\ e'$, properly grooved to receive the propelling-cord. The three rods forming each track are curved concentrically with the axes of the said wheels, the two supporting-rods of each track $a\ a$ and $b\ b$ being at the same distance from the axes of the respective wheels $e\ e'$, while the third or guide rods $a'$ and $b'$ are at greater distances from the axes. The wheels are of such diameter that the boxes B will follow around their peripheries without binding in the tracks. In this construction the plane of the bottom of the box is at right angles to the plane of the guide-wheel in which the axis of the track at either side of said wheel lies, and the propelling-cord comes between the box and wheel, as it should. The wheels $e\ e'$ have V-grooves to receive the propelling-cord, and are provided with flanges $e^2$, projecting beyond the V-grooves, which are just wide enough to receive the jaws $r\ r'$ of the clutches on the box when closed on the cord, as shown in Fig. 12, thus positively preventing the said clutches from opening and releasing the cord in going around the wheel, and it will be seen, referring to Fig. 7$^a$, that the clutches merely lift the cord slightly from the groove of the wheel at a single point and have no tendency to throw the cord off from the wheel.

When the tracks have to make a second angle in a vertical plane in the opposite direction to an angle such as last described, as shown, for instance, at A$^2$, Fig. 1, it is obvious that the guide-wheels, such as just described, cannot be used without inverting the boxes, as the guide-wheels must be above the propelling-cord, and if the boxes were also above the propelling-cord they would come between the said cord and the periphery of the wheel, thus throwing the cord off from the wheel. An angle like that at A$^2$ might be passed, using guide-wheels such as employed at A', by giving the tracks between A and A' a twist half around, so that the boxes would be inverted in passing from A' to A$^2$, and the tracks and boxes would in such case be inverted from their normal position after passing to the horizontal part of the track beyond the angle at A$^2$, and would have to be twisted half around again to bring the track and boxes to the normal upright position preferred for the delivery by the boxes at the stations. It is generally preferable in passing angles of this kind to use the cord-guiding arrangement shown in Figs. 2 and 3, in which the plane of the bottom of the box and track that supports it coincides with the plane of the guide-wheel, this being also the arrangement employed where the way is to change its direction or turn off to either side in a horizontal plane, as shown at A$^3$, Fig. 1. For this purpose the tracks have to be twisted about their longitudinal axis through a quarter-turn between the points A' A$^2$, or so that the bottoms of the boxes when arriving at A$^2$ will be at right angles to the position they had when leaving the wheels at A', and such a quarter-turn of the track is shown in Fig. 1, between the points A' A$^2$, and also beyond the point A$^2$, so that the track is restored to its normal position with the boxes thereon right side up before the latter reach the next angle, A³, which is in this case in the horizontal plane. The twists are made by gradually bending the six wires forming the two tracks helically around the longitudinal axis of the way, which can be done without material change in the position of the three wires forming each track with relation to one another at any point along said track, so that they continue to sustain and guide the boxes the same as if no such twist were made. The construction of the cord-guiding wheels and box-guiding tracks at such angles as those at A² A³, Fig. 1, is best shown in Figs. 2 and 3. At these points the brackets $d^{20}$, that support the guide-rods, instead of extending wholly around the path of the boxes like the ordinary brackets, $d$, such as shown in Fig. 20, used between stations have their upper and lower horizontal members, $d^{21}$ $d^{22}$, extending laterally toward the center of curvature of the way and connected with bearing-pieces $e^{13}$ $e^{14}$ for a stationary spindle, $e^{15}$, (see Fig. 3,) for the wheels $e^{10}$ $e^{12}$, that support and guide the propelling-cord C C'.

The upper horizontal member, $d^{21}$, of the bracket is provided with a downwardly-extended arm, $d^{23}$, that supports the inner rod, or one nearer the center of the wheel of the two supporting-rods for the boxes, and around the periphery of the guide-wheels the inner supporting-rods are flattened, as shown at $a^2$ $b^2$, Figs. 2 and 3, so as to permit the wheels $e^{10}$ $e^{12}$ to come very close to the bottoms of the boxes, so that the cord-holding groove of the said wheels and the cord thereon is at the same distance from the track as the point in the cord held by the clutch of the box, as clearly shown in Fig. 3, so that the said clutch will approach, pass round, and leave the guide-wheels without any tendency to throw the cord off from the grooved wheel. The flattened portions $a^2$ $b^2$ of the track may be riveted to the round portions, as shown at $a^3$ $b^3$, Figs. 2 and 3. The inner rod, $b^2$, of the lower track, instead of being supported on the lower horizontal member, $d^{22}$, of the bracket, as in the straight portion of the track, is supported on an arm, $d^{24}$, extending inward from the outer vertical member of the bracket below the periphery of the upper guide-wheel, $e^5$, and above the periphery of the lower guide-wheel, $e^{12}$, the said arm also supporting the outer lower rod, $a$, of the upper track and the upper or guide rod, $b'$, of the lower track. In order to facilitate the passage of the boxes around the curve and prevent binding on the upper or guide rods, $a'$ $b'$, the latter are flattened at their sides, as shown in Fig. 3.

The terms "horizontal" and "vertical," as used in this description, apply to the parts when in the position shown in Fig. 3 or at A³, Fig. 1. To facilitate the construction of the way, the rods composing the tracks thereof may be made in convenient lengths and bored at one end to receive corresponding tenons of the adjoining piece, as indicated at $b^4$, Fig. 3, and the corner-pieces, such as shown in Figs. 2 and 3, may be made complete, with the rods all bored at their ends to receive corresponding tenons in the straight pieces leading from such corners or angle-pieces, and the parts at stations are also made separately, so that by providing a number of the angle-pieces, station-pieces, and other special parts, which will be hereinafter described, together with lengths of the straight rods and the brackets used between stations, the track may be set up to conform to almost any desired condition.

The rivets by which the rods are fastened together are inserted laterally through the supporting-rods $a$ and $b$, leaving their upper surfaces, over which the boxes slide, smooth, and they are inserted vertically through the guide-rods $a'$ $b'$, as the boxes generally bear laterally against the guide-rods.

The corner pieces are shown in Figs. 2 and 3 as adapted to change the direction at a right angle; but it is obvious that special corner-pieces could be made with the same general construction for greater or less angles, if desired, as indicated at A⁴, Fig. 1, where the said corner-pieces are at an angle in the vertical plane, and the way makes a quarter-twist at either side of the said angle, so that the boxes pass the said angles with their bottoms in a vertical position, the same as at A², instead of in the horizontal position, as at A³. The twists are made in the way without changing its direction, so that the propelling-cord runs substantially straight from the periphery of one guide-wheel to that of the next, and the twisted portion should occupy sufficient length of the way, so that the helical turn of the track-rods will be gentle and will not interfere with the movement of the boxes. By means of corner-pieces, such as shown in Figs. 2 and 3, and by twisting the track about its longitudinal axis, as just described, the track may be made to follow a broken line in any required directions, and the device or arrangement shown at $a'$, Fig. 1, is only required when a station requiring that the track should be in its upright position is too close to the angle to admit of the track being twisted between the station and angle. The lower flanges of the guide-wheels $e^{10}$ $e^{12}$ are wider than the upper flanges, to prevent the propelling-cord from dropping over them, and the outer sides of the jaws $r$ $r'$ of the clutches that connect the boxes with the cord are recessed just above the cord-holding portion, as shown at $r^2$, to receive the upper flange of the wheel, as shown in Fig. 3, so as to permit the cord to remain close to the periphery of the wheel as the box passes around the wheel. This construction prevents the box from becoming detached from the cord or the cord from being thrown off from the wheel. By having the clutches at the middle of the boxes the construction of the corner-piece may be just the same, whether the box is to turn to the right or to the left.

When the track is to make a small angular deviation in a vertical plane, as at A⁵, where the track is shown as rising above its normal level and forming an archway to afford a free passage below, the construction shown in Figs. 4 and 5 may be adopted, in which the track-supporting brackets $d^{30}$ are lengthened vertically, making a somewhat greater space between the upper and lower tracks than in the main portion of the way. In this space is placed a guide-pulley, $e^{20}$, for the propelling-cord C for the upper track, which guide-pulley is wholly above the lower track instead of at one side of it, like the guide-wheel $e$, Fig. 7. The bracket $d^{30}$ (shown in Figs. 4 and 5 and at $A^5$, Fig. 1) has an extension, $d^{31}$, below the lower track, provided with bearings for the pulley $e^{21}$, that guides the lower cord.

The axles $f$ of the pulleys $e^{20}$ $e^{21}$ have their bearing portions of reduced diameter and tapered at their extremities, as shown in Fig. 6, and have their bearings in tubes $f^2$, which are bored out beyond the ends of the axles, as shown, to receive a sponge or other porous material, $f^3$, which may be saturated with a lubricant, so as to supply the bearing for a long time. The bearing-tubes $f^2$ are secured in split lugs on the bracket $d^{30}$, as clearly shown in Figs. 4 and 5.

At the ends of the way remote from the cashier's desk the construction is as shown at $A^6$, Fig. 1, and in Figs. 9 and 10, this part of the way being beyond the last station toward and from which the carriers or boxes travel. At these points the propelling-cord C C' passes around a pulley, $g$, so arranged that the upper part of its periphery is just below the supporting-rods $a$ of the upper track and the lower part of its periphery is just below the supporting-rods $b$ of the lower track, so that the cord passes around the said wheel, moving in one direction, as indicated by the arrow, in proximity to the upper track and in the other direction in proximity to the lower track. The said pulley runs in bearings similar to those used for the pulleys $e^{20}$ $e^{21}$, and shown in Fig. 6, said bearings being supported on a carriage, $g'$, itself supported on and free to slide along the rods $a$ and $b$ of the upper and lower tracks. In order to maintain the propelling-cord C C' at the proper tension and to prevent changes in tension by the shrinking or stretching of the said cord, the carriage $g'$ is drawn toward the end of the track by a cord, $g^2$, passing over a fusee or spirally-grooved winding-drum, $g^3$, actuated by a spring, $g^4$, that, owing to the spiral form of the winding-drum, maintains a substantially uniform pull on the carriage $g'$, insuring a uniform tension on the cord C C'.

If a box should be obstructed on the upper track, which is the track on which obstructions are most likely to occur, it would simply stop the upper member, C, of the cord, and the further propulsion of the said cord by the motor $C^2$ would tend to take up or increase the tension on the lower member, C', of the cord, which would draw the pulley $g$ forward from the end of the track until it slackened the cord sufficiently to allow it to slip on the driving-pulley of the motor, so that the cord would merely stop moving and no injury would result to the apparatus.

At the stations where the boxes are delivered along the line the construction of the upper or return track and mode of operation in delivering the boxes is similar to that shown in Letters Patent No. 284,456, granted to me September 4, 1886. This construction is indicated at $A^7$, Fig. 1, and shown clearly in Figs. 17, 18, and 19.

The station apparatus is all supported from three of the brackets, $d^{10}$ $d^{41}$ $d^{42}$, as clearly shown in Figs. 17 and 18, which hold the supporting-rods $a$ and $b$ of the track the same as at other points. The guiding-rod $a'$ of the upper track is, however, discontinued between the two endmost brackets, $d^{10}$ $d^{42}$, at the station, so that it no longer engages the notches $c$ of the boxes, which may thus be removed from the track unless retained thereon by other means. The boxes are provided at their tops with pins or projections $c^2$, (shown as made integral with the end plates of the boxes,) and the said projections are placed at different distances from the side of the box on boxes belonging to different stations. Those, for instance, on the boxes belonging to the station nearest the cashier's desk are nearest the side of the boxes on the side of the track toward which the boxes move when being delivered, and those on the boxes belonging to the second station are one space farther from that side, and so on. The boxes are shown in this instance as adapted to have pins in five different positions on each side of the notch $c$, making ten different positions in all, or ten stations that a single way or line of transportation can accommodate, and it is to be understood that as many lines as may be required may radiate out from the cashier's desk, all having substantially the same construction as the one herein described and shown, it being understood that by the means described for turning angles in the track in any direction the said tracks may be carried into different stories of a building, and, in fact, into all desired parts of the building, with the same facility that piping can be carried for the purpose of supplying gas or water. At the stations (see Figs. 17 and 18) the space between the endmost brackets, $d^{10}$ $d^{42}$, is spanned by a series of guide-strips, $i$, that are fastened to the brackets by pins $k$, passing through lugs $k'$ on the upper members of the brackets, the said strips being separated from one another by a space sufficient to receive the pins $e^2$ of a box, and being held thus spaced by means of washers $k^2$, placed between them on the pins $k'$. The lower edges of the strips $i$ extend down far enough to bear upon the top of the boxes, and thus prevent them from rising up from the supporting-rods $a$ of the track, and the spaces or grooves between the pairs of adjacent parallel strips, $i$, constitute guides which receive the pins of boxes belonging to stations beyond the station in question, and thus guide the said boxes straight across the space at the station where the guiding-rod $a$ is discontinued, the groove receiving the pins of the box before the latter leaves the guide-rod $a'$ at one side of the station and directing its notches over the guide-rod $a'$ at the other side of the station before the pins leave the groove, so that the box is positively guided at the station the same as at other points. At each station the guide-strips that receive the pins of the boxes belonging to that station are inclined toward one side of the track, as shown at $i'$ $i^2$, Fig. 14, and consequently immediately after the pins of the box enter the groove between the said strips $i'$ $i^2$ and the notches of the box leave the end of the guide-rod $a'$ the box is moved laterally from its normal path toward the side of the track at which it is to be delivered.

The jaws $r$ $r'$ of the clutches on the boxes (see Fig. 11) are operated by a lever, $t$, fulcrumed in lugs $t'$, extending from the rear of the box and acted upon by a spring, $t^2$, tending to raise the lever, which extends across the end of the box and projects slightly beyond the front thereof, as shown in Fig. 13. The said lever is provided with a pin, $t^3$, engaging cam-slots $r^2$ in the jaws $r$ $r'$, which are pivoted upon the end of the box in such a manner that the upward movement of the lever $t$ tends to raise and close the jaws, and the downward movement of the said lever tends to lower and open the jaws, as shown in Fig. 13. When left free the lever $t$ rises sufficiently far to raise the jaws wholly above the level of the bottom of the box, as shown in Fig. 11, so that it can rest evenly on a flat surface, and with the jaws in this position can slide laterally off from the supporting-rods of the track. The lateral movement of the box that is to be delivered at a given station, which movement is produced by the inclined guides $i'$ $i^2$, is sufficient to bring the end of the clutch-operating lever $t$ of the box into engagement with a clutch-disengaging cam, $m$, supported on the intermediate-station bracket $d^{11}$, the upper part of which is slightly wider than the other station-brackets, as shown at $d^{13}$, Fig. 19, and in the forward movement of the boxes, while guided by the strips $i'$ $i^2$, the cam $m$ causes the said lever $t$ to be depressed, and thus opens the clutch-jaws of the box, so that the propelling-cord C is released therefrom.

The guides $d'$ for the portion C of the cord that propels the boxes along the upper track are, as shown in Fig. 19, considerably lower down than the position with relation to the bottom of the box at which the clutch holds the cord, as shown in Fig. 12, so that as soon as the jaws of the clutch are separated by the action of the cam $m$ the cord at once drops by gravity out from the jaws, and is not again engaged by them when they close after passing the cam $m$, and the box then continues to move forward by the momentum it has acquired while being propelled by the cord.

The strip $i'$, beyond the cam $m$, is curved sharply outward, as shown, and by bearing on the guide-pins of the box throws the latter laterally completely off the supporting-rods $a$ of the track, so that it falls on a shelf, E, at the side of the track. The said shelf E is supported on laterally-projecting portions $d^{14}$ $d^{15}$ of the station-brackets $d^{10}$ $d^{11}$, the former projection, $d^{14}$, being on a level with the upper track, and the latter projection, $d^{15}$, on the intermediate bracket, being at the level of the lower track, and the shelf E inclines downward from the level of the upper track to the level of the lower track at a point about midway between the projections $d^{14}$ $d^{15}$, being horizontal for the rest of the distance adjacent to the projection $d^{15}$, as best shown in Fig. 17. A rod or railing, E, extends from the outer upper corners of the projections $d^{14}$ $d^{15}$ of the brackets in a direction substantially parallel with the shelf E, as shown in Fig. 17, and prevents the boxes from falling or being thrown off from the shelf.

In order to apply the boxes to the lower track and connect them with the lower member, C', of the cord by which they are propelled toward the cashier's desk, the guide-rail $b'$ of the lower track has a short gap, (represented at $b^5$, Fig. 17,) slightly greater than the length of the box, which permits the box to be inserted laterally with relation to the track and placed on the supporting-rails $b$ thereof. In order to insure that the notches in the top of the box when thus placed on the lower track are in line with the guide-rod $b'$ thereof, which is pointed, as shown at $b^6$, on the side of the gap toward which the boxes move, an additional guide-rod, $n$, (see Figs. 17, 18, and 19,) is placed in position to engage the rear side of the box when properly centered on the track with its notches in line with the guide-rod $b'$. The said rail $n$ is just above the lugs $t'$, in which the clutch-operating lever $t$ of the box is pivoted, as shown in Fig. 19, and prevents the box from tipping or the rear side from rising when the operator presses down on the said lever to open the jaws. Another guide-rail, $n'$, engages the front lower edge of the box and assists in retaining it with the notches in line with the guide-rod $b'$, and the rails $n$ $n'$ serve to properly guide a box coming from a more remote station past the gap $b^2$ in the guide-rod $b'$ of the lower track. The said guide-rails $n$ $n'$ are pointed or turned outward on the ends where the box first meets them, so that the box cannot strike squarely against them if it happens to be slightly out of line.

The jaws $r$ $r'$ of the clutch (see Figs. 11, 12, and 13) are pivoted on the box B in such manner that when opened by depressing the lever $t$ they move down below the bottom of the box and rise again in closing, and the guides $d'$ for the lower member, C', of the actuating-cord at the stations support the cord at a slightly greater distance below the bottom of the box than it is held by the jaws of the clutch, so that the jaws when closed upon the cord will just clear the guides, as shown in Fig. 12, and consequently when the operator depresses the lever $t$ to open the jaws $r\ r'$ they pass down and by the sides of the cord in opening, and when widely separated, as shown in dotted lines, Fig. 13, the cord springs up between them and is supported by the guides $d'$ so high that the jaws in closing will come below the middle of the cord, as shown in full lines, Fig. 13, and will catch and lift the cord as they close upon it, moving from the position shown in Fig. 13 to that shown in Fig. 12. The construction of the jaws and their operating-lever is similar to that described in Letters Patent No. 314,339; but by having the cord supported by its guide at the proper distance below the track, as just described, and owing to the co-operation of the auxiliary guide-rail $n$, it is not necessary for the operator to separate the jaws before applying the box to the track, as described in that patent; but the box may be placed on the track in the gap $b^5$, and then, if desired, moved slightly along the track until engaged by the guide-rod $b'$, as shown in dotted lines, Fig. 13, and when the box is on the track the operator depresses the lever $t$, after which, by releasing it, the jaws will spring together and seize the cord, and the box will at once start toward the cashier's desk.

The construction of the tracks at the cashier's desk is best shown in Figs. 14, 15, and 16. At this point the supporting-rods $a$ and $b$ of the upper and lower tracks terminate in a bracket or standard, $d^{50}$, which may be supported on the desk, and is provided with guide-pulleys $e^{30}\ e^{31}$ for the upper and lower members of the propelling-cord. The guide-rods $a'\ b'$ terminate before reaching the standard $d^{50}$, and the end of the guide-rod $a'$ is pointed, as shown, so as to readily receive the notches $c$ of the boxes, which are placed by the operator on the supporting-rods $a$ and slipped along toward the guide-rail $a'$, being guided in this movement by an additional guide-rod, $n^{10}$, that operates like the one $n$ on the lower track at the stations, engaging the rear side of the box just above the lugs $t'$, in which the clutch-operating lever $t$ is pivoted. The upper member of the propelling-cord is supported by its guides in such position as to be seized by the jaws $r\ r'$ when they close after being opened by the depression of the lever $t$, after the carrier has been placed on the upper track, as previously described in connection with the lower track at the stations. At the cashier's desk the bracket $d^{50}$ is provided with a disengaging cam, $m^{10}$, co-operating with the boxes on the lower or forwarding track like the one $m$ that co-operates with the boxes on the upper or return track at the stations, but so located as to engage the clutch-operating levers $t$ of all the boxes as they pass, guided by the rod $b'$ of the lower track, thus opening the clutches and permitting the actuating-cord to drop out. It frequently happens that two or more boxes arrive at the cashier's desk in close proximity to one another, in which case the clutch of the following box might hold the cord up while the clutch of the box first arriving was opened by the cam $m^{10}$, and thus prevent the cord from dropping out from the clutch of the box first arriving. In order to prevent such an occurrence and insure the disengagement of each box from the cord upon its arrival at the cashier's desk, a cord-detacher, P, (see Figs. 14, 15, and 16,) is placed over the cord just beyond the cam $m^{10}$, and throws the cord down from the jaws of the clutch, so that it will not be re-engaged by the said jaws after passing the cam $m^{10}$, the jaws then immediately springing up, so as to pass above the cord-detacher P. The guide-rod of the lower track beyond the point where the box is thus disengaged from the propelling-cord is turned aside from the direct line of the track, as shown at $b^{30}$, Fig. 15, directing the box into a trough-like shelf, G, of sufficient length to receive all the boxes that are likely to arrive during the time occupied by the attendant in removing each box, making the proper change, and placing it on the upper track to return it to the station from which it was sent.

The covers $c^3$ of the boxes are hinged to the body of the box and provided with a spring, $c^4$, tending to open the cover, which, when closed, rests on a seat or projection, $c^5$, made by striking up a portion of the front of the box. The cover when closed lies below the bottoms of the notches $c$, that co-operate with the guide-rods $a'\ b'$, and is held closed by a latch, $c^6$, pivoted on the top of the cover, and having its end movable to and fro with relation to a projection, $c^7$, on the inner side of the end of the box. The said latch is provided with an operating-handle, $c^8$, and is so arranged that when engaged to fasten down the cover the said handle $c^8$ lies just at one side of the position occupied by the guide-rods $a'$ or $b'$ of the track, and the latch $c^6$ cannot be disengaged without moving the handle $c^8$ across this line. This arrangement insures that the box cannot be applied to the track until its cover is properly fastened down, and when once applied to the track the cover cannot possibly be unfastened until after the box leaves the track, as the guide-rod prevents the movement of the latch required for unfastening. Further than this, the guide-rod itself would hold the cover down, so that even if the fastening should break the cover could not rise while the box was on the track between the stations. When the clutch of the box is disengaged from the cord, the clutch-operating handle $t$ is sufficiently high to pass above the disengaging-cams $m\ m^{10}$, and the delivery of the box from the track at the proper station is independent of the action of these cams, which only serve to disconnect the boxes from the propelling-cord, and if a box should be accidentally disconnected from the cord at the wrong station or at any other point, it would merely remain on the track until another box belonging to its own station or to a station beyond came along, when the other box would strike the one that was disconnected and push it along in front of it until guided off at the proper station.

The bottoms $c^9$ of the boxes that rest against the supporting-rails are made of some comparatively soft non-metallic material—such as vulcanized fiber or wood—projecting slightly below the metallic sides of the boxes, (see Fig. 13,) and the ends of the boxes around the notches are provided with pieces $c^{10}$ of similar material, that engage the guiding-rods $a'$ $b'$ of the track, thus preventing metallic contact between the boxes and track, so that the boxes run with very little noise.

I claim—

1. In a conveying apparatus, the combination of a track or guideway that embraces the carriers, preventing movement thereof in any direction except lengthwise of the track, and a propelling-cord supported in guides adjacent to and substantially parallel with the track, and wheels or pulleys supporting the said cord at angles in the track, the said track being twisted axially at either side of said pulleys, as described, whereby the plane of the wheel or pulley may be varied with relation to surrounding objects without change with relation to the adjacent co-operating portion of the track, substantially as described.

2. The combination, with a way or line of transportation comprising two tracks, each composed of a series of parallel rods that embrace a carrier and restrain the same from moving except lengthwise of the track, and a propelling-cord, of a corner-piece comprising two guide-wheels, $e\ e'$, placed side by side, and the guide-rods of said track concentric with said wheels, and supporting-brackets that hold the said rods and the bearings for the wheels, which wheels have their plane at right angles to the plane of the supporting part of the track, substantially as described.

3. The combination, with a way or line of transportation comprising two tracks, each composed of a series of parallel rods that embrace a carrier and restrain the same from moving except lengthwise of the track, and a propelling-cord, of a corner-piece comprising two guide-wheels, $e\ e'$, placed side by side, and the guide-rods of said track concentric with said wheels, and supporting-brackets that hold the said rods and the bearings for the wheels, one of said wheels being of larger diameter than the other and extending radially beyond the track that co-operates with the other smaller wheel, substantially as described.

4. The combination, with a way or line of transportation comprising two tracks, each composed of a series of parallel rods that embrace a carrier and restrain the same from moving except lengthwise of the track, and a propelling-cord, and carriers having clutches that engage the propelling-cord, of a corner-piece comprising two guide-wheels, $e\ e'$, placed side by side, and the guide-rods of said track concentric with said wheels, and supporting-brackets that hold the said rods and the bearings for the wheels, which wheels have a cord-receiving groove and flanges beyond said groove that receive the clutch-jaws between them, substantially as described.

5. The combination, with a way or line of transportation comprising two tracks, each composed of a series of parallel rods that embrace a carrier and restrain the same from moving except lengthwise of the track, and a propelling-cord, of a corner-piece comprising two guide-wheels, $e^{10}\ e^{12}$, and a portion of the guide-rods of said track, and supporting-brackets that hold said guide rods and wheels, which wheels have their plane parallel with the plane of the supporting guide-rods, the inner guide-rod being flat and lying close to the side of the wheel, substantially as and for the purpose described.

6. The combination, with a way or line of transportation comprising two tracks, each composed of a series of parallel rods that embrace a carrier and restrain the same from moving except lengthwise of the track, and a propelling-cord, of a corner-piece comprising two guide-wheels, $e^{10}\ e^{12}$, and a portion of each of the guide-rods of said track, and supporting-brackets that hold said guide rods and wheels, which wheels have their plane parallel with the plane of the supporting guide-rods, the inner guide-rod being flat and lying close to the side of the wheel, the carriers having clutches, the jaws of which have cord-receiving depressions on one side and a recess on the other side that receives the flange of the cord-supporting wheel, substantially as described.

7. The combination, of a track comprising supporting-ways, each composed of a series of parallel rods that embrace the carrier and guide the same lengthwise of the track, the said rods being supported at intervals in brackets with one guideway over the other, with an angle-bracket provided with cord-guiding pulleys $e^{20}\ e^{21}$, one corresponding to either guideway and one being located between the two tracks and the other below the lower track, substantially as described.

8. The combination, with a way or line of transportation comprising two tracks, each composed of a series of rods that embrace and guide the carrier, and an endless propelling-cord, the two portions of which run in opposite directions in proximity to the two tracks, of a terminal pulley for said cord at the end of the tracks, and a supporting-carriage for said pulley supported and guided by said tracks and having a longitudinal movement thereon, and a straining device for said terminal pulley fastened upon the said track, whereby the propelling cord or belt is maintained at the proper tension in its normal operation and is relieved when accidentally obstructed, substantially as described.

9. A conveying apparatus comprising a track and carriers supported and guided thereon, provided with clutches, and a propelling cord or belt moving in proximity to said track in position to be engaged by said clutches, combined with a cord-detacher located above the cord and below the path of the carrier, for the purpose of removing the cord from the clutch, substantially as described.

10. The combination, with a track or guideway and carriers longitudinally movable thereon, provided with clutches that engage the propelling-cord and clutch-operating handles, of disengaging-cams supported near the track in position to engage the handles of the carriers that are to be delivered at that point, the said cams being proportioned to the clutch-operating handles, as described, whereby the said handles pass the cams without engagement when the clutch is not connected with the cord, but are engaged by the said cams and operated to open the clutch when engaged by the cord, substantially as described.

11. The combination of the track and propelling-cord moving in proximity thereto with a carrier supported and guided by said track, provided with a clutch the jaws of which move from the body of the box in opening and toward it in closing, and guides $d'$ for the propelling-cord at the points where the carriers are to be connected therewith, located with relation to the track and carrier as described, to hold the said cord in position to be engaged by the jaws of the clutch in closing, but permit the jaws when closed upon the cord to pass clear of said guides, substantially as described.

12. A conveying apparatus comprising a track and boxes movable thereon, the said track having a portion that engages and supports the boxes and a rod that enters a groove in the box and holds it in engagement with the supporting portion of the track and permits lateral movement of the box with relation to the track, the said guide-rod having gaps at points where the carriers are to be applied to the track, combined with auxiliary guide-rods that engage the boxes at such gaps in the main guide-rod and guide the boxes over the gaps and into engagement with the main guide-rod, substantially as described.

13. A conveying apparatus comprising a track and boxes movable thereon, provided with clutches and a clutch-operating lever pivoted in lugs projecting from the body of the box, the said track having a portion that engages and supports the boxes and a rod that enters a groove in the box and holds it in engagement with the supporting portion of the track and prevents lateral movement of the box with relation to the track, the said guide-rod having gaps at points where the carriers are to be applied to the track, combined with auxiliary guide-rods that engage the boxes at such gaps in the main guide-rod and guide the boxes over the gaps and into engagement with the main guide-rod, the said auxiliary rods being located to engage the boxes above the lugs for the clutch-operating handle, substantially as described.

14. In a conveying apparatus, the combination of a track with a carrier movable on said track, said carrier having a cover provided with a movable locking device, said locking device being provided with a projection, located as described, to co-operate with a portion of the track, the said projection being placed in proximity to a portion of the track, and when the cover is unlocked lying in the position occupied by the said portion of the track when the carrier is on the track, which arrangement prevents the carrier from being placed on the track until the cover is locked and prevents the cover from being unlocked while the carrier remains on the track, substantially as described.

15. The combination of the way or line of transportation comprising two tracks and a propelling-cord moving in proximity thereto and supporting-guides $d'$ for said cord, those co-operating with the cord at one track being farther from said track than those co-operating with the cord at the other track, and a carrier co-operating with the said tracks and cords, having a clutch the jaws of which move from the carrier in opening and toward it in closing, whereby they will seize and grip the cord when opened and closed upon the track at which the cord is supported by its guides nearer the carrier than on the other track, at which the cord is supported by its guides at a greater distance from the carrier, and the said jaws will be disengaged from and drop the cord when opened and closed on the last-mentioned track, substantially as described.

In testimony whereof I have signed my name to this specification in the presence of two subscribing witnesses.

JOSEPH C. MARTIN.

Witnesses:
JOS. P. LIVERMORE,
H. P. BATES.